United States Patent [19]

Sims

[11] Patent Number: 5,467,006
[45] Date of Patent: Nov. 14, 1995

[54] ENERGY TRANSFER DEVICE AND METHOD

[75] Inventor: Ronald I. Sims, Saline, Mich.

[73] Assignee: Ford Motor Company, Dearborn, Mich.

[21] Appl. No.: 993,760

[22] Filed: Dec. 21, 1992

[51] Int. Cl.$^6$ .................................... H02J 7/04
[52] U.S. Cl. .................. 320/22; 320/27; 324/427
[58] Field of Search .................. 320/43, 22, 27, 320/29, 30, 48; 324/433

[56] References Cited

U.S. PATENT DOCUMENTS

| | | | |
|---|---|---|---|
| 3,617,850 | 11/1971 | Domshy | 320/31 |
| 3,675,032 | 7/1972 | Shaheen | 290/38 C |
| 3,790,806 | 2/1974 | Lessard | 290/37 |
| 3,796,940 | 3/1974 | Mauch et al. | 320/14 |
| 3,811,049 | 5/1974 | Hildreth et al. | 290/38 |
| 4,061,956 | 12/1977 | Brown et al. | 320/22 |
| 4,072,850 | 2/1978 | McGlynn | 364/424 |
| 4,170,752 | 10/1979 | Busch et al. | 320/44 |
| 4,236,594 | 2/1980 | Ramsperger | 180/167 |
| 4,296,334 | 10/1981 | Wong | 290/37 |
| 4,308,492 | 12/1981 | Mori et al. | 320/32 |
| 4,383,210 | 5/1983 | Wilkinson | 320/2 |
| 4,446,460 | 5/1984 | Tholl et al. | 340/825.69 |
| 4,460,035 | 7/1984 | Mizote et al. | 165/12 |
| 4,498,309 | 2/1985 | Kobayashi | 82/186 |
| 4,532,418 | 7/1985 | Meese et al. | 235/381 |
| 4,553,081 | 11/1985 | Koenck | 320/43 |
| 4,558,281 | 10/1985 | Codd et al. | 324/433 |
| 4,564,905 | 1/1986 | Masada et al. | 364/424 |
| 4,598,373 | 7/1986 | Morishita et al. | 364/424 |
| 4,606,307 | 8/1986 | Cook | 123/179 |
| 4,638,237 | 1/1987 | Fernandez | 320/48 |
| 4,642,770 | 2/1987 | Shirley | 364/424 |
| 4,684,872 | 8/1987 | Stewart | 320/45 |
| 4,724,528 | 2/1988 | Eaton | 364/715 |
| 4,784,212 | 11/1988 | Brimer | 165/2 |
| 4,803,416 | 2/1989 | Abiven et al. | 320/44 |
| 4,820,966 | 4/1989 | Fridman | 320/32 |
| 4,832,258 | 5/1989 | Hoshino | 236/13 |
| 4,849,682 | 7/1989 | Bauer et al. | 320/15 |
| 4,918,368 | 4/1990 | Baker et al. | 320/40 |
| 5,000,139 | 3/1991 | Wong | 123/779 B |
| 5,047,961 | 9/1991 | Simonsen | 364/550 |
| 5,065,320 | 11/1991 | Hayashi et al. | 364/424.01 |
| 5,119,011 | 6/1992 | Lambert | 320/43 |
| 5,281,919 | 1/1994 | Palanisamy | 324/427 |

FOREIGN PATENT DOCUMENTS

| | | |
|---|---|---|
| 0008042 | 8/1978 | European Pat. Off. . |
| 0526426 | 2/1993 | European Pat. Off. . |
| 0533317 | 3/1993 | European Pat. Off. . |
| 0537081 | 10/1993 | European Pat. Off. . |
| 2105065 | 3/1983 | United Kingdom . |
| 9302887 | 2/1993 | WIPO . |

OTHER PUBLICATIONS

S. Ohba "The Development of an EV Air Conditioner and Controls" Symposium, 1988, Chicago, Illinois.
S. Ohba. The Development of an EV Air Conditioner and Controls, The 9th International Electrical Vehicle Symposium, Toronto, 1988.
E. H. Wakefield "History of the Electric Automobile" Society of Automotive Engineers, Inc, 1993, p. 420.
Pursuing Efficiency—IEEE Spectrum Nov. 1992.

*Primary Examiner*—Steven L. Stephan
*Assistant Examiner*—Nicholas Ponomarenko
*Attorney, Agent, or Firm*—Gregory P. Brown; Roger L. May

[57] ABSTRACT

A method for providing energy from a stationary energy source to an electric vehicle having the steps of: determining an energy requirement of the electric vehicle; deriving an energy transfer rate; and transferring energy from the source to the electric vehicle at the rate. An energy transfer device to implement this method includes: a stationary energy source; a device for determining an energy requirement of the electric vehicle; means for deriving an energy transfer rate based on the requirement; and a device for transferring energy from the source to the electric vehicle at the rate.

7 Claims, 2 Drawing Sheets

ENERGY TRANSFER DEVICE AND METHOD

This invention was developed (in part) with U.S. government funds. The U.S. government may have certain rights in this invention.

FIELD OF THE INVENTION

This invention relates to providing energy to electric vehicles. More specifically, the present invention relates to a control system for controlling the transfer of energy into an electric vehicle.

BACKGROUND OF THE INVENTION

Extending the operating range of an electric vehicle is desirable to make electric vehicles commercially successful. One way of achieving this is to minimize the energy requirements of the vehicle while in use. Lighter materials, higher efficiency motors and aerodynamic styling have been employed to reduce energy use. But these features do not reduce or eliminate the energy requirement to maintain a desired interior cabin temperature. U.S. Pat. No. 5,000,139 discloses the use of a remotely controlled timer for automatically starting an internal combustion engine and subsequently controlling the climate control system based on predetermined temperature settings. This system provides a pre-warmed or pre-cooled car for added comfort to the operator over a conventional starting system. A problem associated with systems incorporating timers and remote activation signals for their operation is their continuing requirement for operator input. The system disclosed requires the operator to manually set timers and to activate the system.

It is also desirable to optimize the battery charging of an electric vehicle to take maximum advantage of reduced cost time of day energy rates and to insure the battery is sufficiently charged for the next anticipated use of the vehicle. Timers do not consider the battery state of charge and the optimum charging parameters to deliver the most efficient energy transfer rate possible. It is desirable to have a system that would automatically determine the information necessary to automatically implement any available efficiencies. It would be further desirable to have a system that would automatically invoke any efficiencies without reliance on regular operator input.

SUMMARY OF THE INVENTION

According to the present invention, a method and device is disclosed for providing energy to an electric vehicle. The invention provides a method for providing energy from a stationary energy source to an electric vehicle comprising:

determining an energy requirement of the electric vehicle;

deriving an energy transfer rate; and transferring energy from the source to the electric vehicle at the rate.

An energy transfer device to implement this method includes:

a stationary energy source;

a device for determining an energy requirement of the electric vehicle;

a device for deriving an energy transfer rate based on the requirement; and a device for transferring energy from the source to the electric vehicle at the rate.

The method and apparatus have a variety of uses, but two uses specifically intended include charging the electric vehicle battery and achieving a desired interior cabin temperature using energy from a stationary source rather than the electric vehicle battery. The method for providing energy to an electric vehicle comprises determining energy requirements of the electric vehicle, deriving an energy transfer rate, and transferring energy to the electric vehicle at the derived energy transfer rate.

The invention includes a usage log to approximate when the next anticipated use of the vehicle will occur. This feature allows automatic implementation of processes assuring the most efficient and economical utilization of energy. These and other objects and advantages of the present invention will become apparent from the drawings, description and claims which follow.

DETAILED DESCRIPTION OF THE PREFERRED EMBODIMENTS

The invention will be described as a method and device for providing energy to an electric vehicle. More specifically, the invention will describe automatically determining and providing energy for charging the battery and pre-heating or pre-cooling the interior passenger compartment for an electric vehicle. These are examples of the type of opportunities available for application of the present invention, and are intended for the purpose of illustration rather than limitation.

The invention is intended to be an integral energy transfer device handling all energy between a stationary power source such as an electrical outlet and an electric vehicle. In the alternative, the invention may be used solely to accommodate various components such as battery charging or temperature management.

When the invention is used as a battery charger, it provides the opportunity to take advantage of discounted energy rates while simultaneously optimizing battery charging characteristics. It is anticipated that electric vehicles would be eligible for reduced price electricity during the lowest demand periods. These low demand periods generally occur at night. The invention also permits the charging algorithm to be specifically tailored to the individual battery being charged. For example, electric vehicles will tend to be used as commuter cars driving the same distance to and from work everyday. This use will tend to discharge the battery the same amount everyday. Some types of batteries, for example nickel cadmium, tend to exhibit a memory effect when repeatedly discharged by the same amount. By measuring the state of charge of the battery and predicting the next anticipated use, the battery may be charged so as to avoid this memory effect. All these features may be achieved without operator input.

Figure 1:
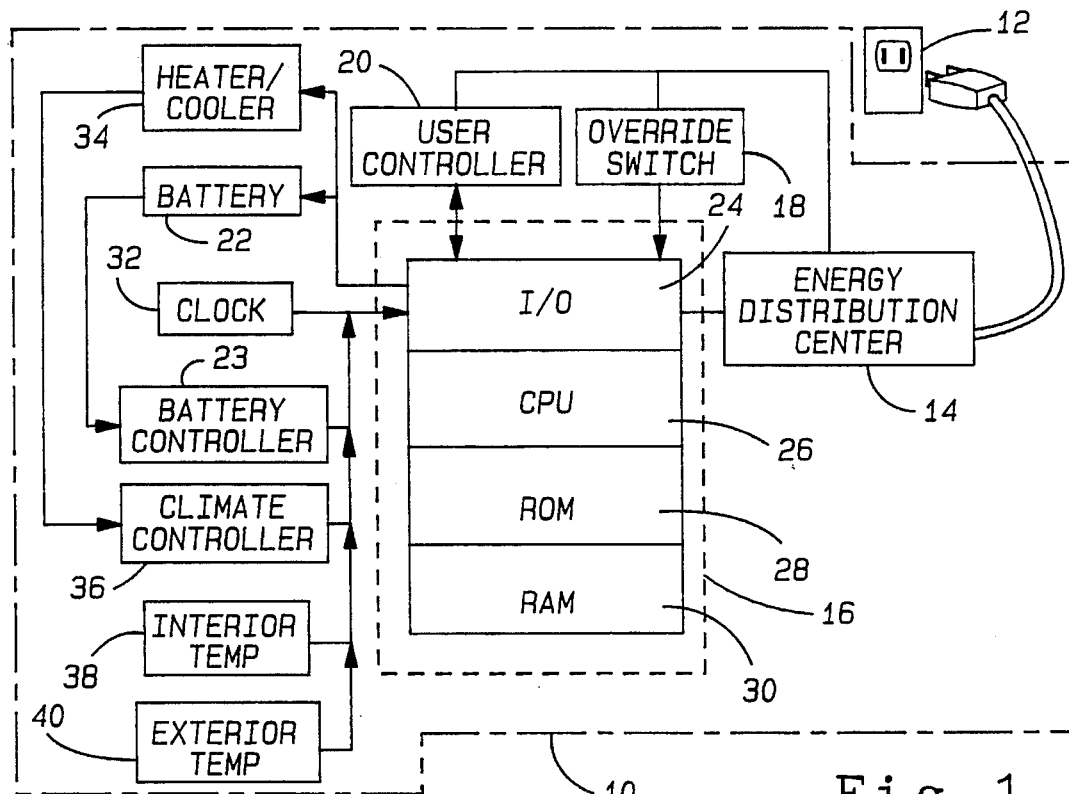
FIG. 1 is a schematic block diagram showing the construction of one embodiment of the invention.

Illustrated in FIG. 1 is a schematic for an energy transfer device 10. It is anticipated that device 10 would be located onboard an electric vehicle. Device 10 is connected to a stationary energy source 12 which is usually an A/C electrical outlet. The invention is also useful in D/C charging or inductive charging. Device 10 receives A/C electrical current into energy distribution center 14. Distribution center 14 supplies energy to controller 16. Controller 16 controls the amount and distribution of electrical energy. Controller 16 may be overridden by switch 18 and receive user desired settings such as the time or length of the next anticipated use through user controller 20. Controller 16 is connected to battery 22 and provides a charging current. Battery controller 23 is connected between battery 22 and controller 16 and measures the battery state of charge and controls battery charging.

Controller 16 includes an input/output (I/O) device 24 for receiving and directing electrical energy. I/O device 24 may include solid state or mechanical switching devices. Computer processing unit 26 controls the operation of device 24. Permanent memory 28 establishes the initial and overall operating parameters for controller 16. Random access memory 30 is used to store vehicle use parameters to taylor the operation of controller 16 to meet the use needs of the vehicle.

Figure 2:
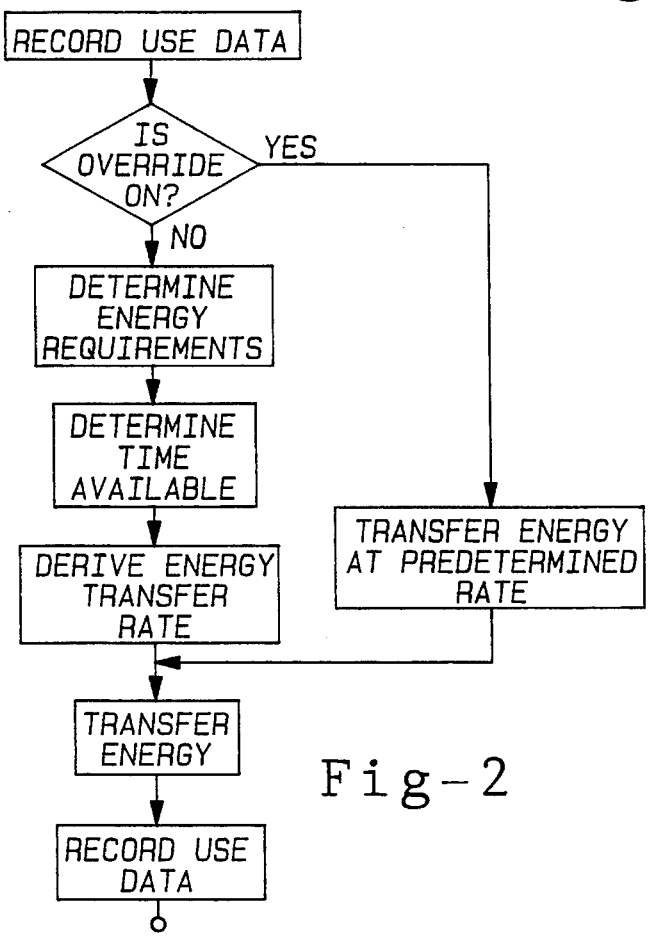
FIG. 2 is a flow chart for the computation of the energy transfer rate according to one embodiment of the invention.

FIG. 2 illustrates a schematic flow chart describing the operation of the invention. The vehicle is connected to stationary power source 12 when not in actual use. Center 14 senses the position of switch 18. If override switch 18 is activated, the battery is charged at a predetermined energy transfer rate regardless of anticipated use or time of day. This feature is useful for opportunity or convenience charging. Opportunity or convenience charging occurs when the vehicle is not in its normal overnight parking position. The predetermined transfer rate would normally be at full power current to recharge the battery in as short a time period as possible.

If the override switch is in the off position, then device 10 determines the energy requirements of the battery. Battery controller 23 determines and records on an on going basis the state of charge of battery 22. The state of charge as well as the date and time are supplied to device 16 and stored in memory 30. This information forms a data base to predict the next anticipated use and trip duration. For example, computer 26 would know what time of day the vehicle was used, energy required for each individual trip and each round trip, the day of week the battery is used and the time of day the vehicle is undergoing recharge.

Controller 23 supplies the battery state of charge measurement to controller 16. CPU 26 queries permanent memory 28 to ascertain the energy of a fully charged battery and then takes the difference between a charged battery and the measured charge to determine the energy required to bring battery 22 to a full state of charge. CPU 26 queries memory 30 to ascertain the next anticipated use of the vehicle and the energy required for this next use. CPU 26 queries clock 32 to determine the total time available for charging before the next anticipated use. CPU 26 then determines the most effective and efficient means for charging battery 22. Generally battery 22 would be charged at a level sufficient to perform the next anticipated vehicle use and begin charging when the electric utility rates are at their lowest. If the electric vehicle cannot be charged within this low cost time period, CPU 26 signals input/output device 24 to begin charging earlier at the higher cost rate to insure the vehicle is at least minimally charged for the next anticipated use.

Various charging algorithms are possible to optimize the charging to the specific battery. For instance, batteries accept charge differently based on their state of charge, temperature, charging voltage and current as well as other factors. Each of these parameters may be modified to optimize the particular charging algorithm with the individual battery. For example, nickel cadmium batteries experience a memory affect when a battery is repeatedly partially discharged to the same state of charge. The battery tends to reduce its overall energy capacity. To avoid this memory affect, device 16 can predict the next anticipated use and insure that there is a sufficient reserve energy within battery 22 to meet this anticipated use yet none-the-less not bring battery 22 to a full state of charge. It would only be partially charged so that it is next discharged to a lower state of charge then normal. This is especially important when using nickel cadmium batteries in commuter vehicle applications where they experience roughly the same daily mileage. When CPU 26 recognizes that the next anticipated use will not occur for some time, it may signal device 24 to discharge battery 22 prior to receiving a full charge.

Figure 3A:
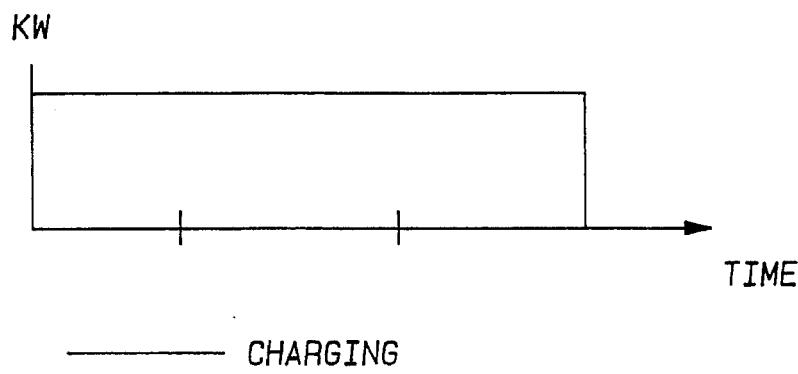
FIG. 3($a$–$c$) are representative energy transfer rates derived according to present invention.
Figure 3B:
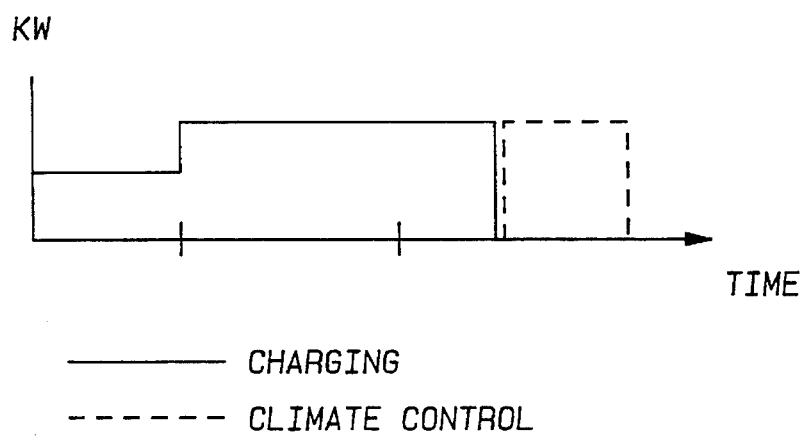
Figure 3C:
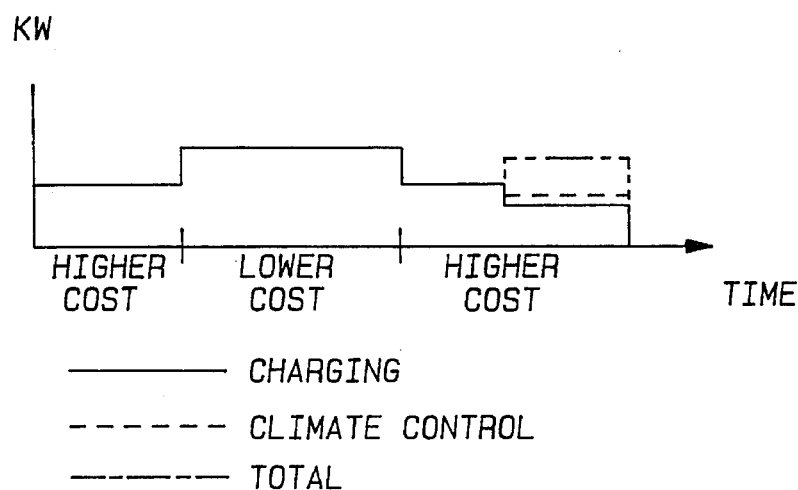

FIGS. 3a–3c illustrate typical charging algorithms using the present invention. FIG. 3a illustrates an opportunity charging. The vehicle is charged at full power for a period of time. FIG. 3c illustrates charging at a lower power during the high cost energy rate and then increasing the charging power to a higher current during the period of lower cost. FIG. 3b illustrates initiating charging at the hight cost rate but at a low power level and then increasing the power level at a lower cost rate. Charging remains at the higher power level at the higher cost rate but terminates prior to the battery being completely charged so that full energy transfer power can be directed to a climate control device.

Either separately or together with battery charging, the invention may also be used as a climate control device to either heat or cool the interior compartment of the vehicle. Climate control device 34 receives energy from device 24 to either heat or cool the interior cabin of the vehicle. Suitable climate control devices capable of heating or cooling the interior cabin of a vehicle include thermal electric coolers, heat pumps, resistive heaters, and motor driven compressors. Device 34 is integrated with climate controller 36 which receives the interior and exterior temperatures from probes 38 and 40 respectively. Device 16 receives the climate information together with the desired temperature settings from controller 20. Device 16 determines the difference between the current interior cabin temperature and the desired temperature and calculates the amount of energy necessary for device 34 to heat or cool the cabin to the desired temperature. The exterior temperature is monitored to avoid unnecessary heating or cooling.

Time of day and day of week usage information are queried from memory 30 to enable device 16 to pre-heat or pre-cool the vehicle with energy from stationary source 12 before the next anticipated use. Illustrated in FIG. 3b is a plot of energy transfer showing both battery charging and climate control. The solid line shows energy being used for battery charging while the dashed line shows energy use for climate control. Conventional residential wiring may not permit simultaneous full power battery charging and climate control. In these circumstances, it may be desirable to terminate battery charging before engaging climate control as illustrated in the graph at FIG. 3b. The graph on FIG. 3c shows simultaneous battery charging and climate control but at reduced power levels. The total amount of energy transferred would not exceed the power handling capabilities of the associated electrical circuits.

The invention permits the use of adaptive or intelligent energy transfer schemes wherein the most efficient use of energy may be determined for a particular application. For example, it may be more efficient to terminate battery charging before the battery is fully charged and initiate climate control to extend the total vehicle range. The system also permits the climate control to work in conjunction with the battery charging so as not to overtax the electrical circuits. If the vehicle contains a thermal energy storage device, excess heating or cooling energy may be directed to this temperature storage device during low cost energy rates to be subsequently used in the operation of the vehicle.

The invention has been illustrated as a method of charging a battery and controlling the temperature of a vehicle. Other applications which require a transfer of energy from a stationary source to a vehicle are also included within the scope of the invention such as charging a super capacitor, pre-heating an internal combustion engine, and operating fans, motors and other electrical devices.

We claim:

1. A method of transferring energy from a stationary energy source to an electric vehicle comprising:

analyzing a usage log;

determining an energy requirement of said electric vehicle based on said usage log;

deriving an energy transfer rate based on said usage log; and transferring energy from said source to said electric vehicle at said rate to operate vehicle components such as a climate control device of said electric vehicle to achieve a desired interior compartment temperature.

2. The energy transfer method as defined by claim 1, wherein said energy requirement determining steps further comprises the steps of:

analyzing a usage log; and updating said usage log.

3. The energy transfer method as defined by claim 1, wherein said energy transfer rate deriving step further comprises the steps of:

analyzing energy availability from said source;

determining a time period to transfer said energy; and analyzing said energy availability and said time period to derive said energy transfer rate.

4. The energy transfer method as defined by claim 1, wherein said energy transfer step further comprises charging a battery.

5. A method for providing energy to a climate control system in an electric vehicle comprising the steps of:

determining an energy requirement of said system by analyzing a usage log;

determining an energy transfer rate based on said energy requirement; and transferring energy to said system at said rate.

6. The method as defined by claim 5, wherein said energy requirement determining step further comprises the steps of:

measuring the ambient temperature;

analyzing a usage log to determine a desired temperature; and analyzing said measured temperature and said desired temperature to determine said energy requirement.

7. The method as defined by claim 5, wherein said energy transfer rate determining step further comprises the steps of:

analyzing energy availability from a stationary energy source;

determining the current times;

analyzing a usage log to determine the time for an anticipated use of said electric vehicle; and calculating a temperature adjusting period based on said current time and said anticipated use; and analyzing said availability, temperature adjusting period and said energy requirement to determine said energy transfer rate.

* * * * *